United States Patent
Porat et al.

(10) Patent No.: US 12,284,136 B2
(45) Date of Patent: *Apr. 22, 2025

(54) PUNCTURED NULL DATA PACKET (NDP) WITHIN WIRELESS COMMUNICATIONS

(71) Applicant: Avago Technologies International Sales Pte. Limited, Singapore (SG)

(72) Inventors: Ron Porat, San Diego, CA (US); Jun Zheng, San Diego, CA (US)

(73) Assignee: Avago Technologies International Sales Pte. Limited

( * ) Notice: Subject to any disclaimer, the term of this patent is extended or adjusted under 35 U.S.C. 154(b) by 0 days.

This patent is subject to a terminal disclaimer.

(21) Appl. No.: 18/585,556

(22) Filed: Feb. 23, 2024

(65) Prior Publication Data

US 2024/0195586 A1 Jun. 13, 2024

Related U.S. Application Data

(63) Continuation of application No. 17/567,813, filed on Jan. 3, 2022, now Pat. No. 11,936,590, which is a
(Continued)

(51) Int. Cl.
*H04L 5/00* (2006.01)
*H04B 7/0417* (2017.01)
(Continued)

(52) U.S. Cl.
CPC ......... *H04L 5/0057* (2013.01); *H04B 7/0417* (2013.01); *H04B 7/0452* (2013.01);
(Continued)

(58) Field of Classification Search
None
See application file for complete search history.

(56) References Cited

U.S. PATENT DOCUMENTS 9,973,225 B1 * 5/2018 Jalloul ................. H04B 1/1027
10,154,520 B1   12/2018 Hedayat et al.
(Continued)

FOREIGN PATENT DOCUMENTS

WO    WO-2019/137419 A1    7/2019

OTHER PUBLICATIONS

Deng Der-Jiunn et al: "IEEE 802.11ax: Highly Efficient WLANs for Intelligent Information Infrastructure", IEEE Communications Magazine, IEEE Service Center, Piscataway, US, vol. 55, No. 12, Dec. 1, 2017 (Dec. 1, 2017), pp. 52-59, XP011674426, ISSN: 0163-6804, DOI: 10.1109/MCOM.2017.1700285 [retrieved on Dec. 13, 2017].
(Continued)

*Primary Examiner* — Phirin Sam
(74) *Attorney, Agent, or Firm* — Foley & Lardner LLP

(57) ABSTRACT

A wireless communication device (alternatively, device, WDEV, etc.) includes at least one processing circuitry configured to support communications with other WDEV(s) and to generate and process signals for such communications. In one example, the circuitry is configured to generate a null data packet (NDP), transmit at least a portion of the NDP to another wireless communication device via fewer than all of a plurality of sub-channels of a communication channel, and receive feedback from the another wireless communication device that is based on the another wireless communication processing the at least the portion of the NDP that is received via the fewer than all of the plurality of sub-channels of the communication channel. In one example, the generated NDP includes at least one signal field (SIG) field therein that includes information to specify a preamble puncturing option or the information is transmitted in a previous packet.

22 Claims, 10 Drawing Sheets

Related U.S. Application Data continuation of application No. 16/262,504, filed on Jan. 30, 2019, now Pat. No. 11,218,275.

(60) Provisional application No. 62/632,976, filed on Feb. 20, 2018.

(51) Int. Cl.
  *H04B 7/0452* (2017.01)
  *H04W 84/12* (2009.01)

(52) U.S. Cl.
  CPC .......... *H04L 5/0007* (2013.01); *H04L 5/0023* (2013.01); *H04L 5/0039* (2013.01); *H04L 5/0055* (2013.01); *H04W 84/12* (2013.01)

(56) References Cited

U.S. PATENT DOCUMENTS

| | | | |
|---|---|---|---|
| 11,936,590 B2 * | 3/2024 | Porat | H04L 5/0023 |
| 2015/0124677 A1 | 5/2015 | Asterjadhi | |
| 2015/0326409 A1 | 11/2015 | Kim et al. | |
| 2016/0057657 A1 * | 2/2016 | Seok | H04L 5/0044 |
| | | | 370/476 |
| 2016/0088641 A1 * | 3/2016 | Kwon | H04L 5/006 |
| | | | 370/329 |
| 2016/0165589 A1 | 6/2016 | Chu et al. | |
| 2016/0233932 A1 | 8/2016 | Hedayat et al. | |
| 2016/0295513 A1 | 10/2016 | Moon et al. | |
| 2016/0301452 A1 | 10/2016 | Kwon et al. | |
| 2017/0047972 A1 | 2/2017 | Chu et al. | |
| 2017/0079027 A1 | 3/2017 | Chun et al. | |
| 2017/0111148 A1 | 4/2017 | Park et al. | |
| 2017/0279507 A1 | 9/2017 | Kim et al. | |
| 2017/0331534 A1 | 11/2017 | Jiang et al. | |
| 2018/0006789 A1 | 1/2018 | Lee et al. | |
| 2018/0007712 A1 | 1/2018 | Lou et al. | |
| 2018/0092127 A1 | 3/2018 | Park | |
| 2018/0295580 A1 | 10/2018 | Wang et al. | |
| 2018/0351620 A1 * | 12/2018 | Su | H04B 7/0626 |
| 2018/0359761 A1 * | 12/2018 | Chun | H04W 72/21 |
| 2019/0215037 A1 | 7/2019 | Seok et al. | |
| 2019/0238301 A1 | 8/2019 | Verma et al. | |
| 2019/0261369 A1 | 8/2019 | Verma et al. | |
| 2020/0080224 A1 | 3/2020 | Li et al. | |
| 2020/0107318 A1 * | 4/2020 | Chu | H04W 4/06 |
| 2020/0195315 A1 | 6/2020 | Wang et al. | |
| 2021/0045114 A1 | 2/2021 | Chen et al. | |
| 2021/0092206 A1 | 3/2021 | Sugaya | |
| 2023/0188192 A1 * | 6/2023 | Moon | H04B 7/0639 |
| | | | 370/329 |
| 2023/0300879 A1 * | 9/2023 | Lou | H04W 74/006 |
| | | | 370/329 |

OTHER PUBLICATIONS

European Office Action on U.S. Appl. No. 16/262,504 on non-Foley case related to U.S. Appl. No. 16/262,504 DTD Nov. 27, 2020.
Final Office Action on U.S. Appl. No. 16/262,504 DTD Apr. 9, 2021.
Non-Final Office Action on U.S. Appl. No. 16/262,504 DTD Jun. 30, 2021.
Non-Final Office Action on U.S. Appl. No. 17/567,813 DTD Dec. 22, 2022.
Non-Final Office Action on U.S. Appl. No. 16/262,504 dated Sep. 24, 2020 (19 pages).
Notice of Allowance on U.S. Appl. No. 16/262,504 DTD Aug. 31, 2021.
Notice of Allowance on U.S. Appl. No. 17/567,813 DTD Nov. 17, 2023.
US Office Action on U.S. Appl. No. 16/262,504 DTD May 1, 2020.

* cited by examiner

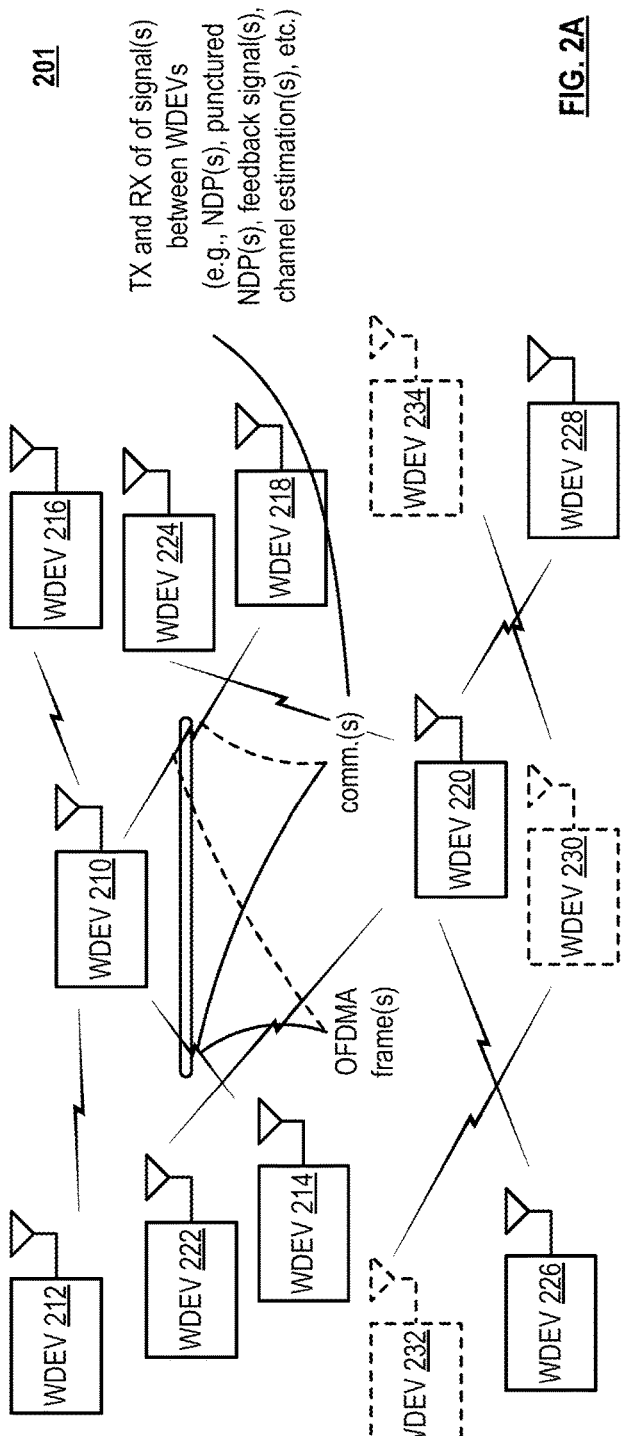
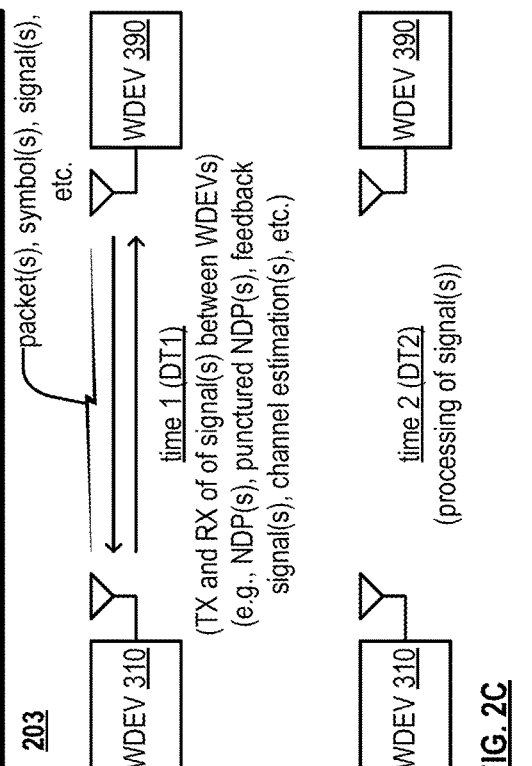
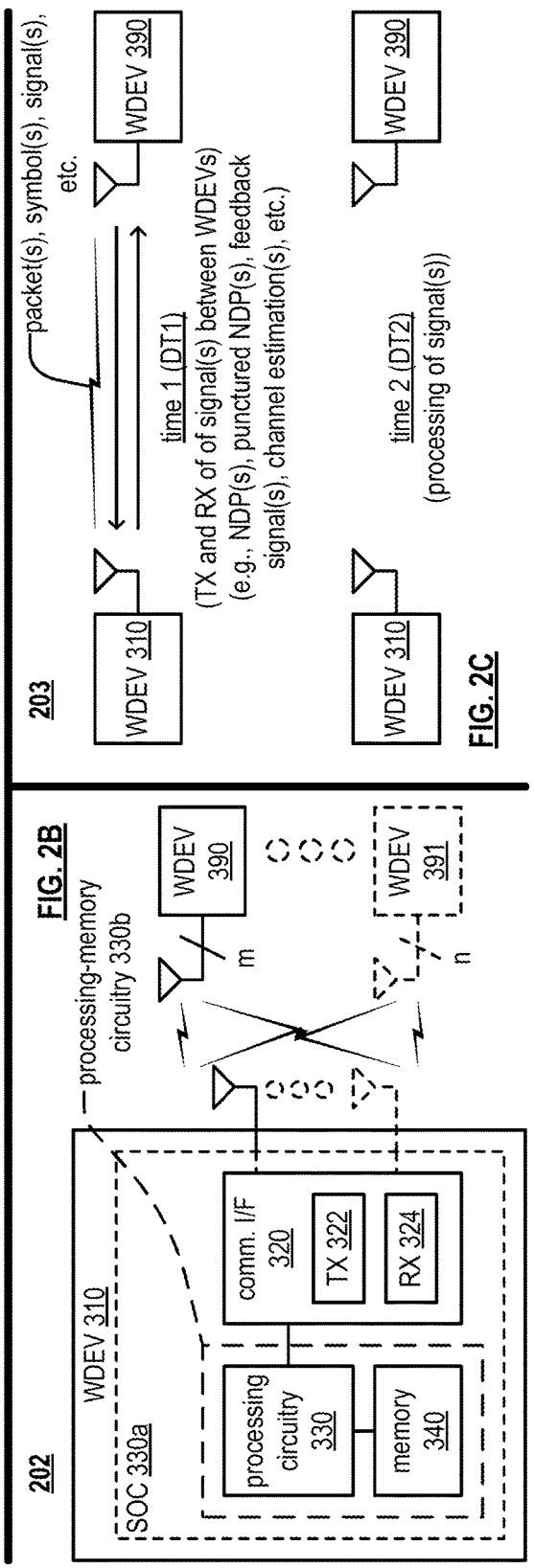

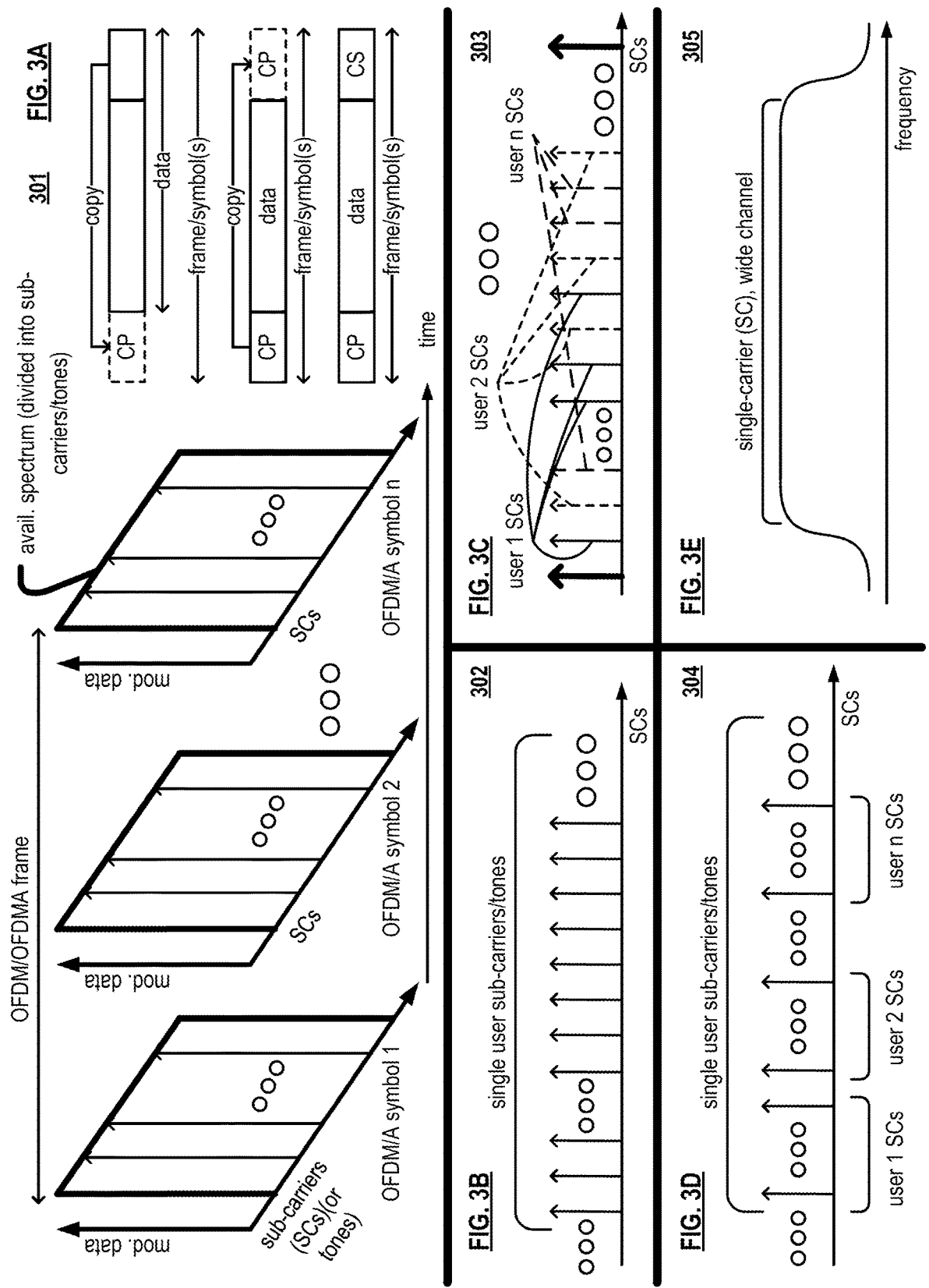

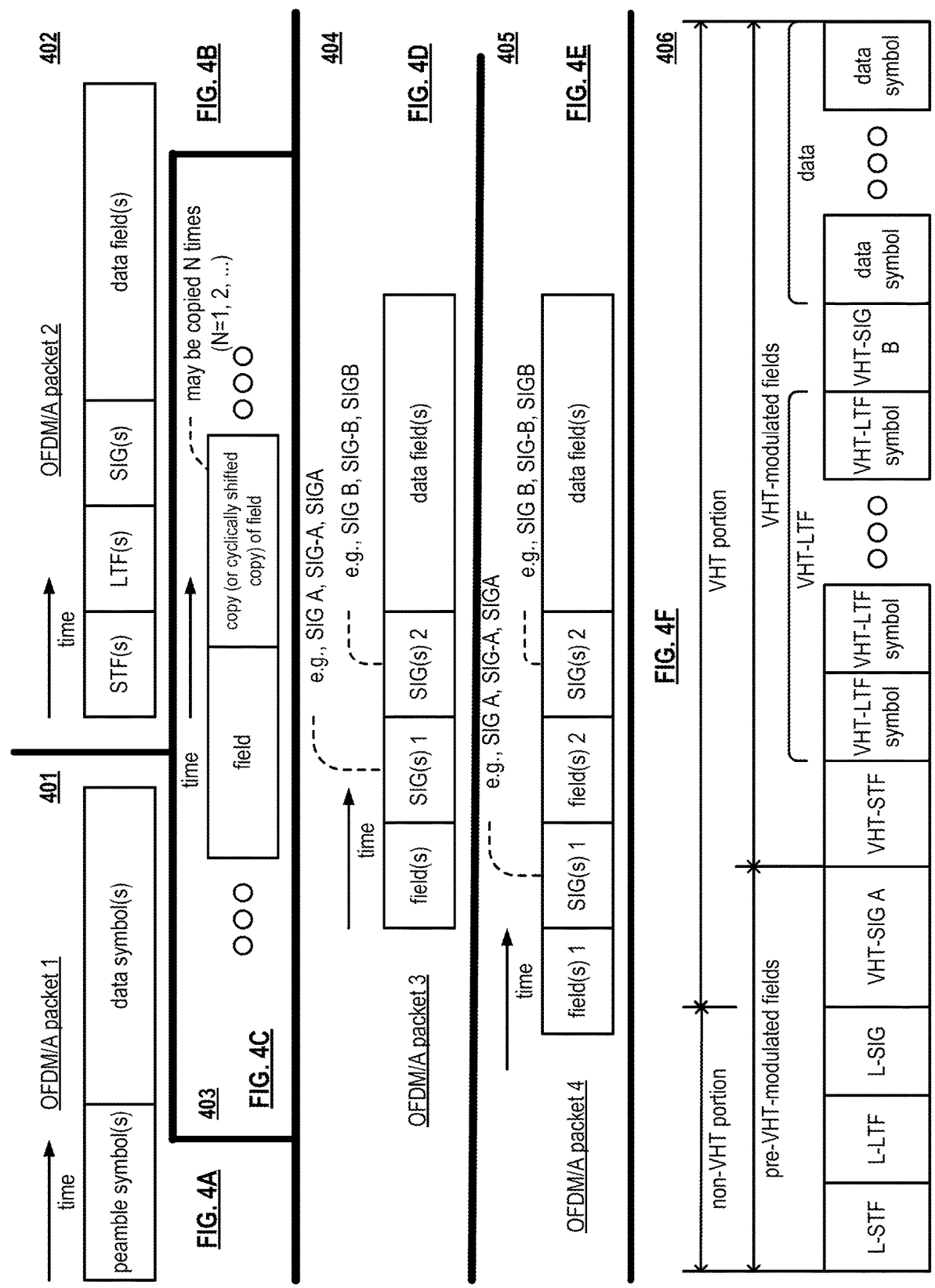

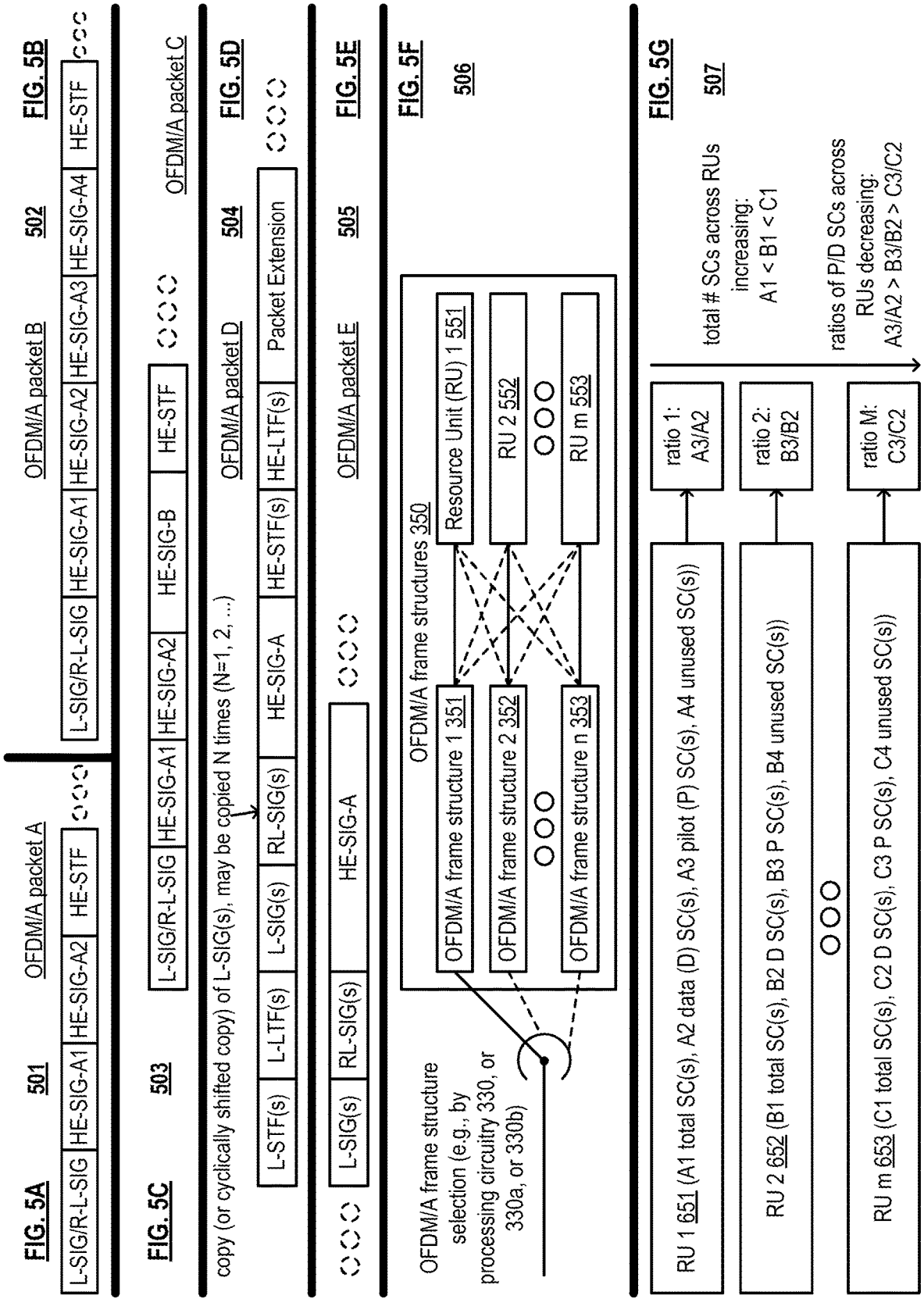

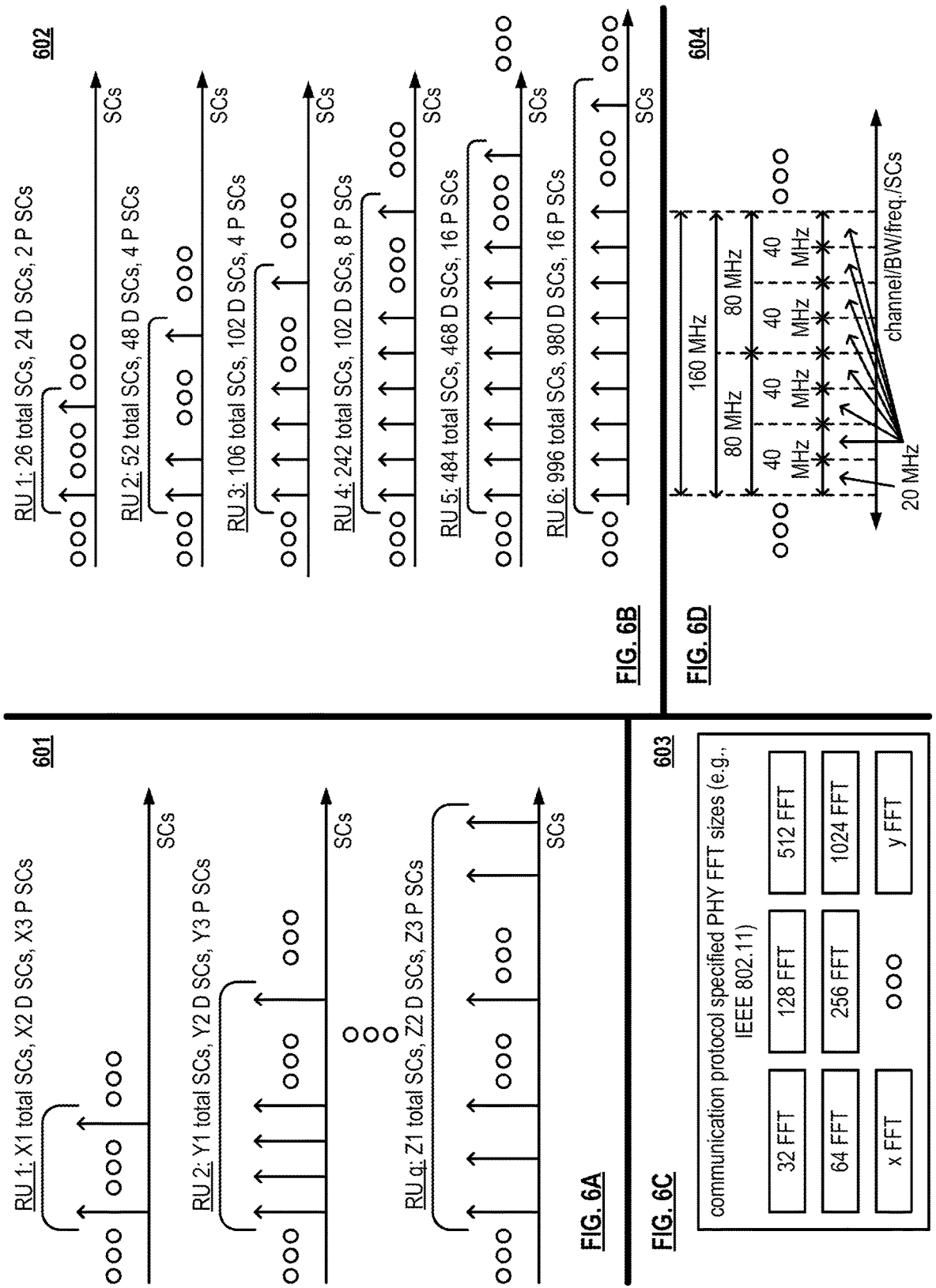

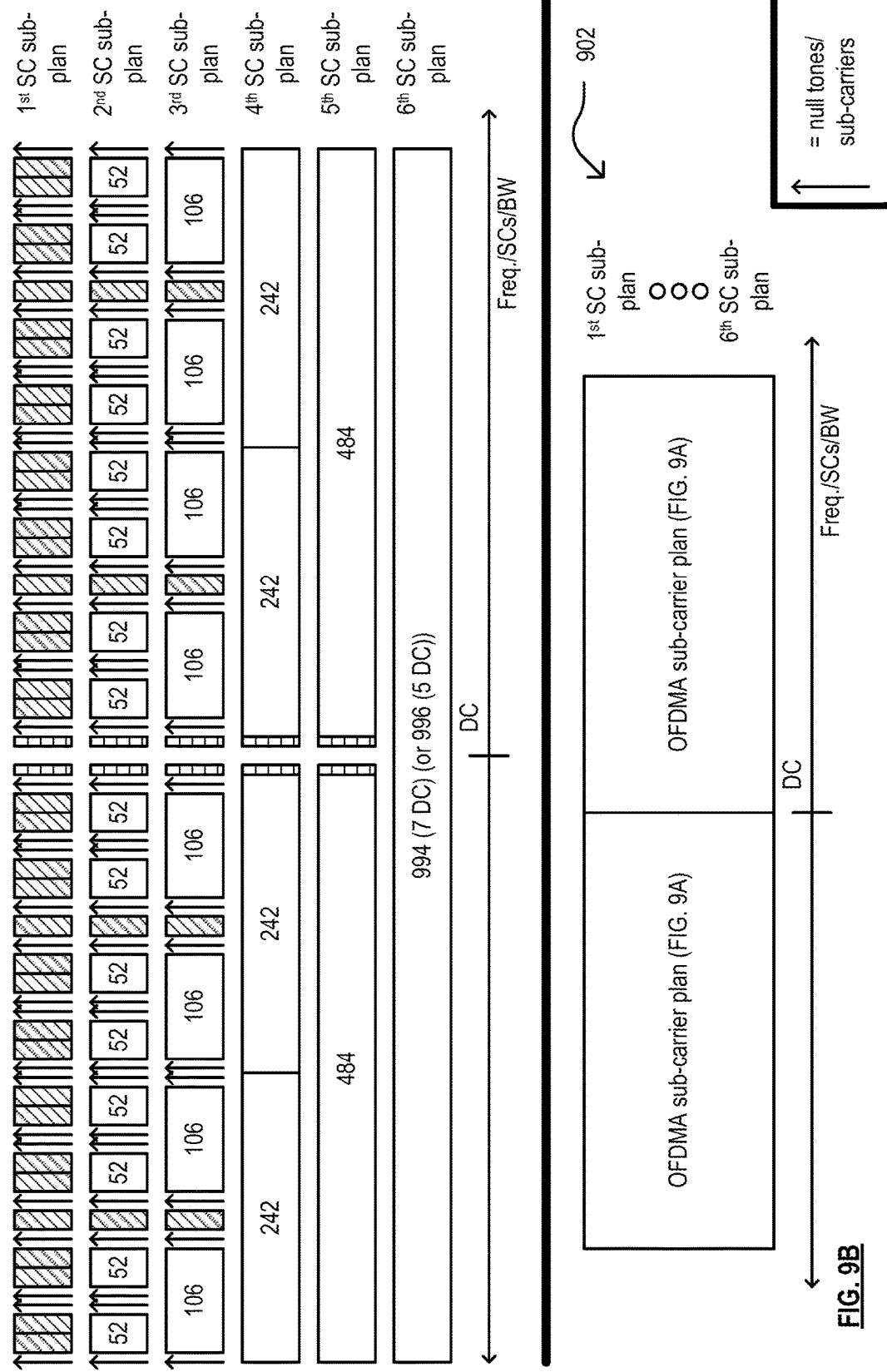

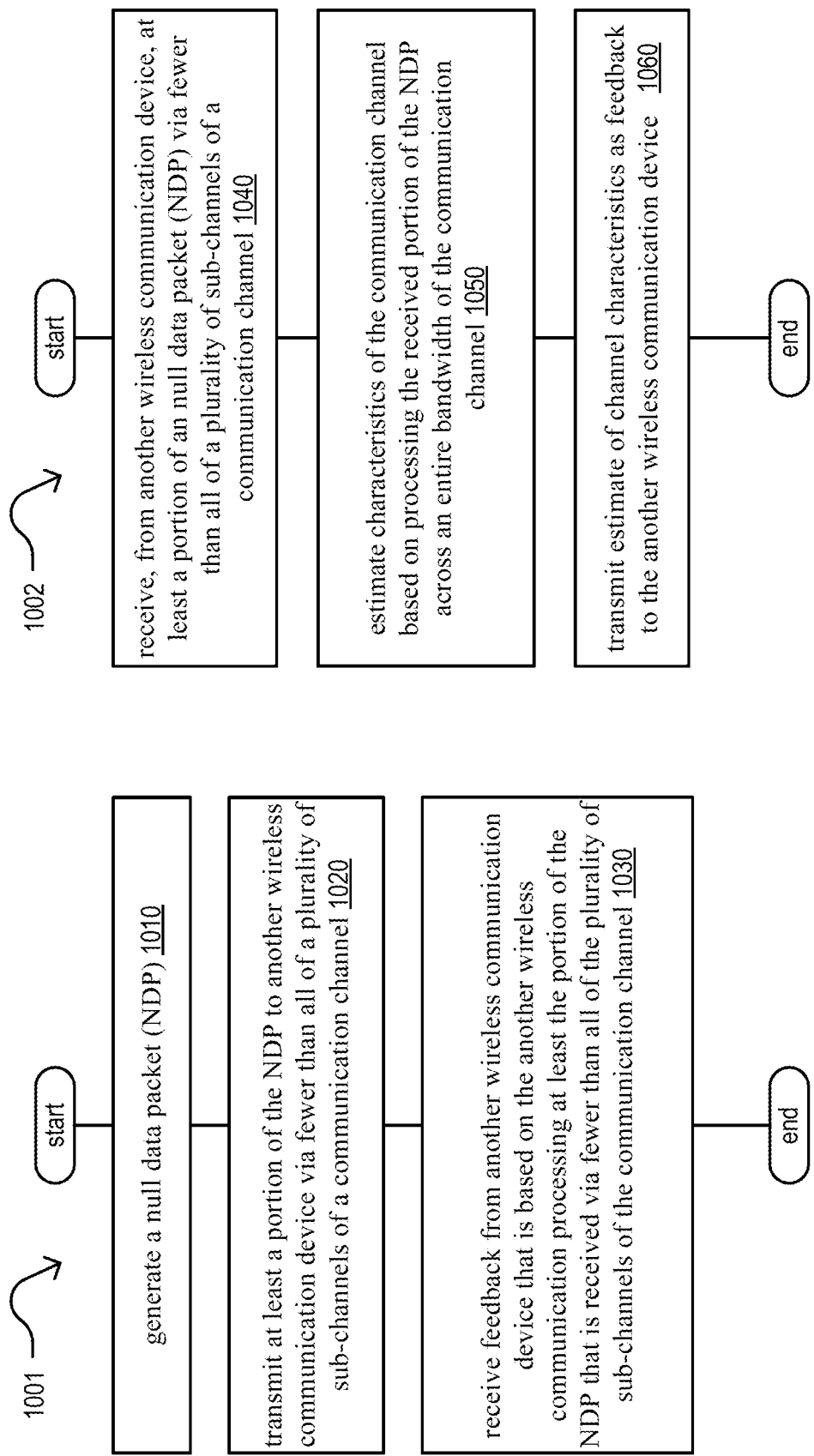

PUNCTURED NULL DATA PACKET (NDP) WITHIN WIRELESS COMMUNICATIONS

CROSS REFERENCE TO RELATED PATENTS/PATENT APPLICATIONS

This application claims the benefit of and priority to U.S. patent application Ser. No. 17/567,813, entitled "Punctured Null Data Packet (NDP) Within Wireless Communications," filed Jan. 3, 2022, which claims the benefit of and priority to U.S. patent application Ser. No. 16/262,504, entitled "Punctured Null Data Packet (NDP) Within Wireless Communications," filed Jan. 30, 2019, which claims the benefit of and priority to U.S. Provisional Patent Application No. 62/632,976, entitled "Punctured Null Data Packet (NDP) Within Wireless Communications," filed Feb. 20, 2018, the entirety of each of which is incorporated by reference herein.

TECHNICAL FIELD

The present disclosure relates generally to communication systems; and, more particularly, to wireless communications within single user, multiple user, multiple access, and/or multiple-input-multiple-output (MIMO) wireless communications.

BACKGROUND

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennas and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennas to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

However, note that certain standards, protocols, and/or recommended practices and associated NDP designs that are used to enable a receiver wireless communication device (e.g., wireless station (STA), etc.) to estimate the channel in order to enable transmit beamforming and downlink (DL) multiple-user multiple-input-multiple-output (MU-MIMO) do not support preamble puncturing (e.g., not using one or more of the 20 MHz sub-channels of an 80 MHz BW, a 160 MHz BW, and/or an 80+80 MHz BW, etc.). As such, the operation in accordance with a preamble puncturing mode may be limited in performance in many cases.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of at least one portion of an OFDM/A packet.

FIG. 4B is a diagram illustrating another example of at least one portion of an OFDM/A packet of a second type.

FIG. 4C is a diagram illustrating an example of at least one portion of an OFDM/A packet of another type.

FIG. 4D is a diagram illustrating another example of at least one portion of an OFDM/A packet of a third type.

FIG. 4E is a diagram illustrating another example of at least one portion of an OFDM/A packet of a fourth type.

FIG. 4F is a diagram illustrating another example of at least one portion of an OFDM/A packet.

FIG. 5A is a diagram illustrating another example of at least one portion of an OFDM/A packet.

FIG. 5B is a diagram illustrating another example of at least one portion of an OFDM/A packet.

FIG. 5C is a diagram illustrating another example of at least one portion of an OFDM/A packet.

FIG. 5D is a diagram illustrating another example of at least one portion of an OFDM/A packet.

FIG. 5E is a diagram illustrating another example of at least one portion of an OFDM/A packet.

FIG. 5F is a diagram illustrating an example of selection among different OFDM/A frame structures for use in communications between wireless communication devices and specifically showing OFDM/A frame structures corresponding to one or more resource units (RUS).

FIG. 5G is a diagram illustrating an example of various types of different resource units (RUs).

FIG. 6A is a diagram illustrating another example of various types of different RUs.

FIG. 6B is a diagram illustrating another example of various types of different RUs.

FIG. 6C is a diagram illustrating an example of various types of communication protocol specified physical layer (PHY) fast Fourier transform (FFT) sizes.

FIG. 6D is a diagram illustrating an example of different channel bandwidths and relationship there between.

FIG. 7 is a diagram illustrating another example of different channel bandwidths and relationship there between.

FIG. 9A is a diagram illustrating another example of an OFDMA tone/sub-carrier plan.

FIG. 9B is a diagram illustrating another example of an OFDMA tone/sub-carrier plan.

FIG. 10A is a diagram illustrating an embodiment of a method for execution by at least one wireless communication device.

FIG. 10B is a diagram illustrating another embodiment of a method for execution by at least one wireless communication device.

DETAILED DESCRIPTION

Figure 1:
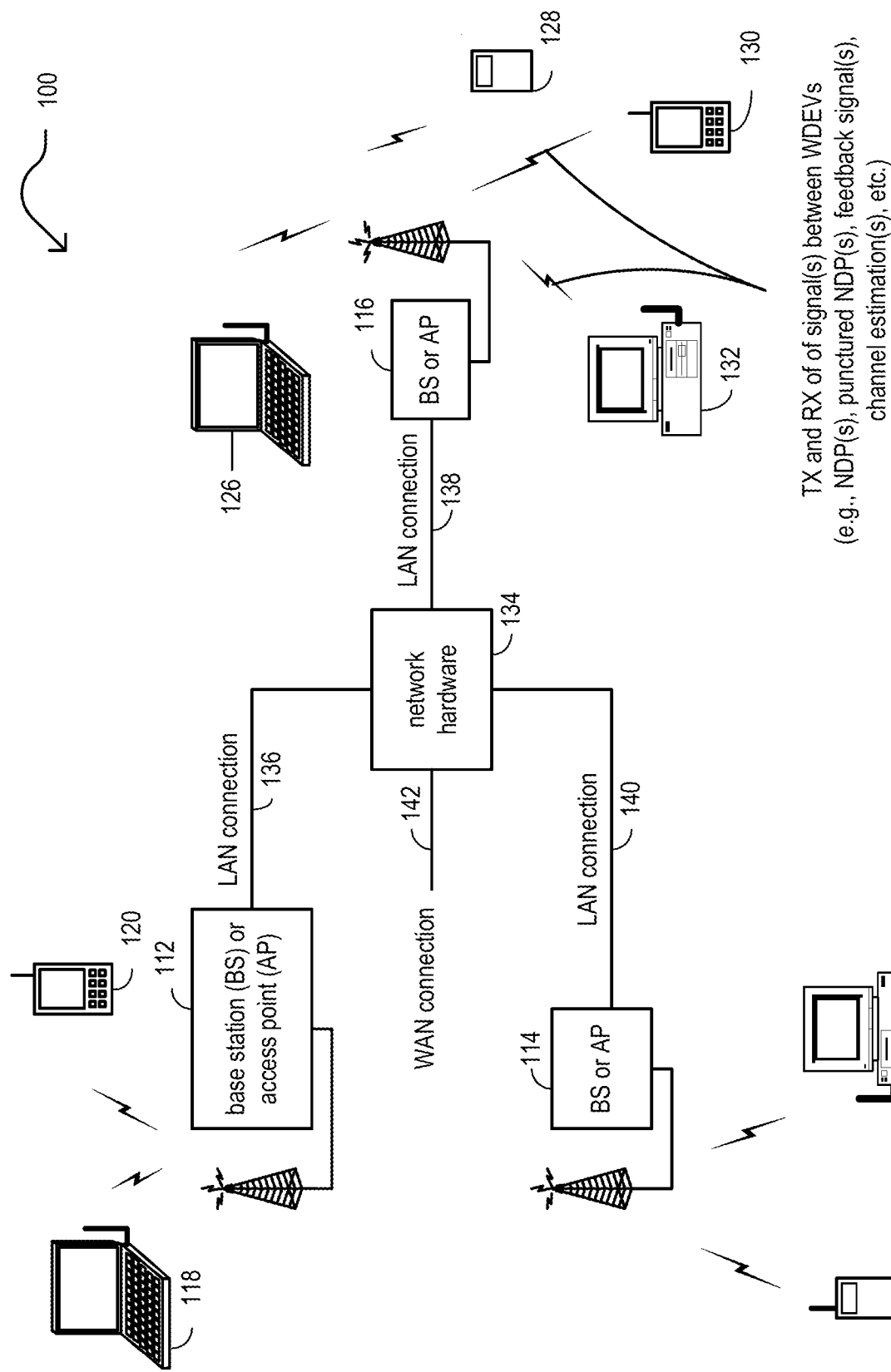
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include processing circuitry and/or a communication interface to support communications with any other of the wireless communication devices 118-132 and BSs or APs 112-116. In an example of operation, processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such processing circuitry includes all capability, functionality, and/or circuitry, etc. to perform such operations as described herein. In some other examples, such a communication interface includes all capability, functionality, and/or circuitry, etc. to perform such operations as described herein. In even other examples, such processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 118-132 and BSs or APs 112-116) includes processing circuitry to support communications with one or more of the other wireless communication devices (e.g., any other of the WDEVs 118-132 and BSs or APs 112-116). For example, such processing circuitry is configured to perform both processing operations as well as communication interface related functionality. Such processing circuitry may be implemented as a single integrated circuit, a system on a chip, etc.

In another example of implementation and operation, a wireless communication device (e.g., any one of the WDEVs 118-132 and BSs or APs 112-116) includes processing circuitry and a communication interface configured to support communications with one or more of the other wireless communication devices (e.g., any other of the WDEVs 118-132 and BSs or APs 112-116).

In an example of operation and implementation, BS/AP 116 supports communications with WDEVs 130, 132. In another example, BS/AP 116 supports communications with WDEV 130 (e.g., only with WDEV 130 and not with WDEV 132 or alternatively, only with WDEV 132 and not with WDEV 130).

Note that the forms of communications between the various wireless communication devices may be varied and may include one or more of null data packet(s) (NDP(s)), punctured NDP(s), feedback signal(s), channel estimation(s), etc.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area (indoor and/or outdoor) with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennas, and WDEV 391 may include n antennas).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, a system-on-a-chip (SOC) 330a may be implemented to include the processing circuitry 330, the communication interface 320 (including the TX 322 and/or RX 324 thereof), and the memory 340 (e.g., SOC 330a being a multi-functional, multi-module integrated circuit that includes multiple components therein). Considering another example, processing-memory circuitry 330b may be implemented to include functionality similar to both the processing circuitry 330 and the memory 340 yet the communication interface 320 is a separate circuitry (e.g., processing-memory circuitry 330b is a single integrated circuit that performs functionality of processing circuitry and a memory and is coupled to and also interacts with the communication interface 320).

Considering even another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes SOC 330a configured to perform various operations. In even other examples, the device 310 includes processing-memory circuitry 330b configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 310 may be communicated via any of these types of communication systems.

Note that the forms of communications between the various wireless communication devices may be varied and may include one or more of null data packet(s) (NDP(s)), punctured NDP(s), feedback signal(s), channel estimation(s), etc.

FIG. 2C is a diagram illustrating another example 203 of communication between wireless communication devices. At or during a first time (e.g., time 1 (DT1)), the WDEV 310 transmits signal(s) to WDEV 390, and/or the WDEV 390 transmits other signal(s) to WDEV 310. At or during a second time (e.g., time 2 (DT2)), the WDEV 310 processes signal(s) received from WDEV 390, and/or the WDEV 390 processes signal(s) received from WDEV 310.

In some examples, the signal(s) communicated between WDEV 310 and WDEV 390 may include or be based on and/or other information for use in supporting channel estimation, channel characterization, etc. and/or other communications between WDEV 310 and WDEV 390.

Note that the forms of communications between the various wireless communication devices may be varied and may include one or more of null data packet(s) (NDP(s)), punctured NDP(s), feedback signal(s), channel estimation(s), etc.

In another example of operation and implementation, at or during a first time (e.g., time 1 (DT1)), the WDEV 310 is configured to transmit a null data packet (NDP) to WDEV 390. In some examples, the NDP includes puncturing of one or more preamble portions therein. In some examples, the WDEV 310 is configured to transmit signaling to the WDEV 390 that indicates particularly what form of puncturing of one or more preamble portions of the NDP is performed by the WDEV 310 (e.g., within the NDP and/or within one or more other communications from the WDEV 310 to the WDEV 390). Then, at or during a second time (e.g., time 2 (DT2)), the WDEV 310 processes the NDP received from WDEV 390 and generates another signal (e.g., feedback) based thereon to be transmitted to the WDEV 310. The WDEV 390 then transmits the feedback to the other signal (e.g., feedback) to the WDEV 390 to be processed by the WDEV 310 (e.g., such as to process channel characterization, channel estimation, etc.).

In another example of implementation and operation, the WDEV 310 includes both processing circuitry to perform many of the operations described above and also includes a communication interface, coupled to the processing circuitry, that are configured in combination to support communications within a satellite communication system, a wireless communication system, a wired communication system, a fiber-optic communication system, and/or a mobile communication system. For example, certain operations may be performed by only the processing circuitry, other certain operations may be performed by only the communication interface, and even some other certain operations may be performed by both the processing circuitry and the communication interface.

In some examples, the communication interface is configured to transmit the first OFDMA frame and/or the third OFDMA frame to WDEV 390 and/or WDEV 391. Also, the communication interface is configured to receive the second OFDMA frame from WDEVs 390-391. In some other examples, the processing circuitry is configured to transmit the first OFDMA frame and/or the third OFDMA frame to WDEV 390 and/or WDEV 391 via the communication interface. Also, the processing circuitry is configured to receive the second OFDMA frame from WDEVs 390-391 via the communication interface. In even other examples, both the communication interface and the communication interface operate cooperatively and are configured to generate, process, transmit, etc. the first OFDMA frame and/or the third OFDMA frame to WDEV 390 and/or WDEV 391. Also, the communication interface and the communication interface operate cooperatively and are configured to receive, process, etc. the second OFDMA frame from WDEVs 390-391.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems.

In addition, as shown in right hand side of FIG. 3A, a cyclic prefix (CP) and/or cyclic suffix (CS) (e.g., shown in right hand side of FIG. 3A, which may be a copy of the CP) may also be employed within the guard interval to allow switching time (e.g., such as when jumping to a new communication channel or sub-channel) and to help maintain orthogonality of the OFDM and/or OFDMA symbols. In some examples, a certain amount of information (e.g., data bits) at the end portion of the data portion is/are copied and placed at the beginning of the data to form the frame/symbol(s). In a specific example, consider that the data includes data bits $x_0, x_1, \ldots x_{N-Nep}, \ldots, x_{N-1}$, where the $x_{N-Nep}$ bit is the first bit of the end portion of the data portion that is to be copied, then the bits $x_{N-Nep}, \ldots, x_{N-1}$, are copied and placed at the beginning of the frame/symbol(s). Note that such end portion of the data portion is/are copied and placed at the beginning of the data to form the frame/symbol(s) may also be shifted, cyclically shifted, and/or copied more than once, etc. if desired in certain embodiments. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include processing circuitry and the communication interface (or alternatively different respective configuration of circuitries, such as SOC 330a and/or processing-memory circuitry 330b shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

In prior IEEE 802.11 legacy prior standards, protocols, and/or recommended practices, including those that operate in the 2.4 GHz and 4 GHz frequency bands, certain preambles are used. For use in the development of a new standard, protocol, and/or recommended practice, a new preamble design is presented herein that permits classification of all current preamble formats while still enabling the classification of a new format by new devices. In addition, various embodiments, examples, designs, etc. of new short training fields (STFs) and long training fields (LTFs) are presented herein.

FIG. 4A is a diagram illustrating an example 401 of at least one portion of an OFDM/A packet. This packet includes at least one preamble symbol followed by at least one data symbol. The at least one preamble symbol includes information for use in identifying, classifying, and/or categorizing the packet for appropriate processing.

FIG. 4B is a diagram illustrating another example 402 of at least one portion of an OFDM/A packet of a second type. This packet also includes a preamble and data. The preamble is composed of at least one short training field (STF), at least one long training field (LTF), and at least one signal field (SIG). The data is composed of at least one data field. In both this example 402 and the prior example 401, the at least one data symbol and/or the at least one data field may generally be referred to as the payload of the packet. Among other purposes, STFs and/or LTFs can be used to assist a device to identify that a frame is about to start, to synchronize timers, to select an antenna configuration, to set receiver gain, to set up certain of the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. This disclosure presents, among other things, a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 4C is a diagram illustrating another example 403 of at least one portion of at least one portion of an OFDM/A packet of another type. A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 4D is a diagram illustrating another example 404 of at least one portion of an OFDM/A packet of a third type. In this example 404, the OFDM/A packet includes one or more fields followed by one or more first signal fields (SIG(s) 1) followed by one or more second signal fields (SIG(s) 2) followed by and one or more data field.

FIG. 4E is a diagram illustrating another example 405 of at least one portion of an OFDM/A packet of a fourth type. In this example 405, the OFDM/A packet includes one or more first fields followed by one or more first signal fields (SIG(s) 1) followed by one or more second fields followed by one or more second signal fields (SIG(s) 2) followed by and one or more data field.

FIG. 4F is a diagram illustrating another example 406 of at least one portion of an OFDM/A packet. Such a general preamble format may be backward compatible with prior IEEE 802.11 prior standards, protocols, and/or recommended practices.

In this example 406, the OFDM/A packet includes a legacy portion (e.g., at least one legacy short training field (STF) shown as L-STF, legacy signal field (SIG) shown as L-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

Various diagrams below are shown that depict at least a portion (e.g., preamble) of various OFDM/A packet designs.

FIG. 5A is a diagram illustrating another example 501 of at least one portion of an OFDM/A packet. In this example 501, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a short training field (STF) based on a newer, developing, etc. communication standard, protocol, and/or recommended practice (shown as HE-STF, e.g., where HE again corresponds to high efficiency) followed by one or more fields.

FIG. 5B is a diagram illustrating another example 502 of at least one portion of an OFDM/A packet. In this example 502, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-A3, e.g., where HE again corresponds to high efficiency) followed by a fourth at least one SIG based on a newer, developing, etc. communication standard, protocol, and/or recommended practice (shown as HE-SIG-A4, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields.

FIG. 5C is a diagram illustrating another example 502 of at least one portion of an OFDM/A packet. In this example 503, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-B, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields. This example 503 shows a distributed SIG design that includes a first at least one SIG-A (e.g., HE-SIG-A1 and HE-SIG-A2) and a second at least one SIG-B (e.g., HE-SIG-B).

FIG. 5D is a diagram illustrating another example 504 of at least one portion of an OFDM/A packet. This example 504 depicts a type of OFDM/A packet that includes a preamble and data. The preamble is composed of at least one short training field (STF), at least one long training field (LTF), and at least one signal field (SIG).

In this example 504, the preamble is composed of at least one short training field (STF) that corresponds to a prior or legacy communication standard, protocol, and/or recommended practice relative to a newer, developing, etc. communication standard, protocol, and/or recommended practice (shown as L-STF(s)) followed by at least one long training field (LTF) that corresponds to a prior or legacy communication standard, protocol, and/or recommended practice relative to a newer, developing, etc. communication standard, protocol, and/or recommended practice (shown as L-LTF(s)) followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by another at least one STF based on a newer, developing, etc. communication standard, protocol, and/or recommended practice (shown as HE-STF(s), e.g., where HE again corresponds to high efficiency) followed by another at least one LTF based on a newer, developing, etc. communication standard, protocol, and/or recommended practice (shown as HE-LTF(s), e.g., where HE again corresponds to high efficiency) followed by at least one packet extension followed by one or more fields.

FIG. 5E is a diagram illustrating another example 505 of at least one portion of an OFDM/A packet. In this example 505, the preamble is composed of at least one field followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by one or more fields.

Note that information included in the various fields in the various examples provided herein may be encoded using various encoders. In some examples, two independent binary convolutional code (BCC) encoders are implemented to encode information corresponding to different respective modulation coding sets (MCSs) that are can be selected and/or optimized with respect to, among other things, the respective payload on the respective channel. Various communication channel examples are described with respect to FIG. 6D below.

Also, in some examples, a wireless communication device generates content that is included in the various SIGs (e.g., SIGA and/or SIGB) to signal MCS(s) to one or more other wireless communication devices to instruct which MCS(s) for those one or more other wireless communication devices to use with respect to one or more communications. In addition, in some examples, content included in a first at least one SIG (e.g., SIGA) include information to specify at least one operational parameter for use in processing a second at least one SIG (e.g., SIGB) within the same OFDM/A packet.

Various OFDM/A frame structures are presented herein for use in communications between wireless communication devices and specifically showing OFDM/A frame structures corresponding to one or more resource units (RUs). Such OFDM/A frame structures may include one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

FIG. 5F is a diagram illustrating an example 506 of selection among different OFDM/A frame structures for use in communications between wireless communication devices and specifically showing OFDM/A frame structures 350 corresponding to one or more resource units (RUs). This diagram may be viewed as having some similarities to allocation of sub-carriers to different users as shown in FIG. 4D and also shows how each OFDM/A frame structure is associated with one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

In one example, OFDM/A frame structure 1 351 is composed of at least one RU 1 551. In another example, OFDM/A frame structure 1 351 is composed of at least one RU 1 551 and at least one RU 2 552. In another example, OFDM/A frame structure 1 351 is composed of at least one RU 1 551, at least one RU 2 552, and at least one RU m 553. Similarly, the OFDM/A frame structure 2 352 up through OFDM/A frame structure n 353 may be composed of any combinations of the various RUs (e.g., including any one or more RU selected from the RU 1 551 through RU m 553).

FIG. 5G is a diagram illustrating an example 507 of various types of different resource units (RUs). In this example 502, RU 1 551 includes A1 total sub-carrier(s), A2 data (D) sub-carrier(s), A3 pilot (P) sub-carrier(s), and A4 unused sub-carrier(s). RU 2 552 includes B1 total sub-carrier(s), B2 D sub-carrier(s), B3 P sub-carrier(s), and B4 unused sub-carrier(s). RUN 553 includes C1 total sub-carrier(s), C2 D sub-carrier(s), C3 P sub-carrier(s), and C4 unused sub-carrier(s).

Considering the various RUs (e.g., across RU 1 551 to RUN 553), the total number of sub-carriers across the RUs increases from RU 1 551 to RUN 553 (e.g., A1<B1<C1). Also, considering the various RUs (e.g., across RU 1 551 to RU N 553), the ratio of pilot sub-carriers to data sub-carriers across the RUs decreases from RU 1 551 to RUN 553 (e.g., A3/A2>B3/B2>C3/C2).

In some examples, note that different RUs can include a different number of total sub-carriers and a different number of data sub-carriers yet include a same number of pilot sub-carriers.

As can be seen, this disclosure presents various options for mapping of data and pilot sub-carriers (and sometimes unused sub-carriers that include no modulation data or are devoid of modulation data) into OFDMA frames or packets (note that frame and packet may be used interchangeably herein) in various communications between communication devices including both the uplink (UL) and downlink (DL) such as with respect to an access point (AP). Note that a user may generally be understood to be a wireless communication device implemented in a wireless communication system (e.g., a wireless station (STA) or an access point (AP) within a wireless local area network (WLAN/WiFi)). For example, a user may be viewed as a given wireless communication device (e.g., a wireless station (STA) or an access point (AP), or an AP-operative STA within a wireless communication system). This disclosure discussed localized mapping and distributed mapping of such sub-carriers or tones with respect to different users in an OFDMA context (e.g., such as with respect to FIG. 4C and FIG. 4D including allocation of sub-carriers to one or more users).

Some versions of the IEEE 802.11 standard have the following physical layer (PHY) fast Fourier transform (FFT) sizes: 32, 64, 128, 256, 512.

These PHY FFT sizes are mapped to different bandwidths (BWs) (e.g., which may be achieved using different down-clocking ratios or factors applied to a first clock signal to generate different other clock signals such as a second clock signal, a third clock signal, etc.). In many locations, this disclosure refers to FFT sizes instead of BW since FFT size determines a user's specific allocation of sub-carriers, RUs, etc. and the entire system BW using one or more mappings of sub-carriers, RUs, etc.

This disclosure presents various ways by which the mapping of N users' data into the system BW tones (localized or distributed). For example, if the system BW uses 256 FFT, modulation data for 8 different users can each use a 32 FFT, respectively. Alternatively, if the system BW uses 256 FFT, modulation data for 4 different users can each use a 64 FFT, respectively. In another alternative, if the system BW uses 256 FFT, modulation data for 2 different users can each use a 128 FFT, respectively. Also, any number of other combinations is possible with unequal BW allocated to different users such as 32 FFT to 2 users, 64 FFT for one user, and 128 FFT for the last user.

Localized mapping (e.g., contiguous sub-carrier allocations to different users such as with reference to FIG. 3D) is preferable for certain applications such as low mobility users (e.g., that remain stationary or substantially stationary and whose location does not change frequently) since each user can be allocated to a sub-band based on at least one characteristic. An example of such a characteristic includes allocation to a sub-band that maximizes its performance (e.g., highest SNR or highest capacity in multi-antenna system). The respective wireless communication devices (users) receive frames or packets (e.g., beacons, null data packet (NDP), data, etc. and/or other frame or packet types) over the entire band and feedback their preferred sub-band or a list of preferred sub-bands. Alternatively, a first device (e.g., transmitter, AP, or STA) transmits at least one OFDMA packet to a second communication device, and the second device (e.g., receiver, a STA, or another STA) may be configured to measure the first device's initial transmission occupying the entire band and choose a best/good or preferable sub-band. The second device can be configured to transmit the selection of the information to the first device via feedback, etc.

In some examples, a device is configured to employ PHY designs for 32 FFT, 64 FFT and 128 FFT as OFDMA blocks inside of a 256 FFT system BW. When this is done, there can be some unused sub-carriers (e.g., holes of unused sub-carriers within the provisioned system BW being used). This can also be the case for the lower FFT sizes. In some examples, when an FFT is an integer multiple of another, the larger FFT can be a duplicate a certain number of times of the smaller FFT (e.g., a 512 FFT can be an exact duplicate of two implementations of 256 FFT). In some examples, when using 256 FFT for system BW the available number of tones is 242 that can be split among the various users that belong to the OFDMA frame or packet (DL or UL).

In some examples, a PHY design can leave gaps of sub-carriers between the respective wireless communication devices (users) (e.g., unused sub-carriers). For example, users 1 and 4 may each use a 32 FFT structure occupying a total of 26×2=52 sub-carriers, user 2 may use a 64 FFT occupying 56 sub-carriers and user 3 may use 128 FFT occupying 106 sub-carriers adding up to a sum total of 214 sub-carriers leaving 28 sub-carriers unused.

In another example, only 32 FFT users are multiplexed allowing up to nine (9) users with 242 sub-carriers−(9 users×26 RUs)=eight (8) unused sub-carriers between the users. In yet another example, four (4) 64 FFT users are multiplexed with 242 sub-carriers−(4 users×56 RUs)=18 unused sub-carriers.

The unused sub-carriers can be used to provide better separation between users especially in the UL where users' energy can spill into each other due to imperfect time/frequency/power synchronization creating inter-carrier interference (ICI).

FIG. 6A is a diagram illustrating another example 601 of various types of different RUs. In this example 601, RU 1 includes X1 total sub-carrier(s), X2 data (D) sub-carrier(s), X3 pilot (P) sub-carrier(s), and X4 unused sub-carrier(s). RU 2 includes Y1 total sub-carrier(s), Y2 D sub-carrier(s), Y3 P sub-carrier(s), and Y4 unused sub-carrier(s). RU q includes Z1 total sub-carrier(s), Z2 D sub-carrier(s), Z3 P sub-carrier(s), and Z4 unused sub-carrier(s). In this example 601, note that different RUs can include different spacing between the sub-carriers, different sub-carrier densities, implemented within different frequency bands, span different ranges within at least one frequency band, etc.

FIG. 6B is a diagram illustrating another example 602 of various types of different RUs. This diagram shows RU 1 that includes 26 contiguous sub-carriers that include 24 data sub-carriers, and 2 pilot sub-carriers; RU 2 that includes 52 contiguous sub-carriers that include 48 data sub-carriers, and 4 pilot sub-carriers; RU 3 that includes 106 contiguous sub-carriers that include 102 data sub-carriers, and 4 pilot sub-carriers; RU 4 that includes 242 contiguous sub-carriers that include 234 data sub-carriers, and 8 pilot sub-carriers; RU 5 that includes 484 contiguous sub-carriers that include 468 data sub-carriers, and 16 pilot sub-carriers; and RU 6 that includes 996 contiguous sub-carriers that include 980 data sub-carriers, and 16 pilot sub-carriers.

Note that RU 2 and RU 3 include a first/same number of pilot sub-carriers (e.g., 4 pilot sub-carriers each), and RU 5 and RU 6 include a second/same number of pilot sub-carriers (e.g., 16 pilot sub-carriers each). The number of pilot sub-carriers remains same or increases across the RUs. Note also that some of the RUs include an integer multiple number of sub-carriers of other RUs (e.g., RU 2 includes 52 total sub-carriers, which is 2× the 26 total sub-carriers of RU 1, and RU 5 includes 484 total sub-carriers, which is 2× the 242 total sub-carriers of RU 4).

FIG. 6C is a diagram illustrating an example 603 of various types of communication protocol specified physical layer (PHY) fast Fourier transform (FFT) sizes. The device 310 is configured to generate and transmit OFDMA packets based on various PHY FFT sizes as specified within at least one communication protocol. Some examples of PHY FFT sizes, such as based on IEEE 802.11, include PHY FFT sizes such as 32, 64, 128, 256, 512, 1024, and/or other sizes.

In one example, the device 310 is configured to generate and transmit an OFDMA packet based on RU 1 that includes 26 contiguous sub-carriers that include 24 data sub-carriers, and 2 pilot sub-carriers and to transmit that OFDMA packet based on a PHY FFT 32 (e.g., the RU 1 fits within the PHY FFT 32). In one example, the device 310 is configured to generate and transmit an OFDMA packet based on RU 2 that includes 52 contiguous sub-carriers that include 48 data sub-carriers, and 4 pilot sub-carriers and to transmit that OFDMA packet based on a PHY FFT 56 (e.g., the RU 2 fits within the PHY FFT 56). The device 310 uses other sized RUs for other sized PHY FFTs based on at least one communication protocol.

Note also that any combination of RUs may be used. In another example, the device 310 is configured to generate and transmit an OFDMA packet based on two RUs based on RU 1 and one RU based on RU 2 based on a PHY FFT 128 (e.g., two RUs based on RU 1 and one RU based on RU 2 includes a total of 104 sub-carriers). The device 310 is configured to generate and transmit any OFDMA packets based on any combination of RUs that can fit within an appropriately selected PHY FFT size of at least one communication protocol.

Note also that any given RU may be sub-divided or partitioned into subsets of sub-carriers to carry modulation data for one or more users (e.g., such as with respect to FIG. 3C or FIG. 3D).

FIG. 6D is a diagram illustrating an example 604 of different channel bandwidths and relationship there between. In one example, a device (e.g., the device 310) is configured to generate and transmit any OFDMA packet based on any of a number of OFDMA frame structures within various communication channels having various channel bandwidths. For example, a 160 MHz channel may be subdivided into two 80 MHz channels. An 80 MHZ channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc.

Operation in accordance with certain standards, protocols, and/or recommended practices (e.g., including the developing IEEE 802.11ax), operation is supported for preamble puncturing for 80 MHz, 160 MHz and 80+80 MHz transmission bandwidth (BW). For example, such an operational mode enables a transmitter wireless communication device (e.g., an access point (AP), an AP-operative STA, etc.) not to transmit on one or more 20 MHz sub-channels therein. For example, this may include the transmitter wireless communication device configured to transmit on only 60 MHz in a 80 MHz BW (e.g., using only 3 of the 20 MHz sub-channels of the 80 MHz BW, and note the 60 MHz may be contiguous or non-contiguous such that the 3 of the 20 MHz sub-channels of the 80 MHz BW may be 3 consecutive/adjacent 20 MHz sub-channels or there may be 1 20 MHz sub-channel that is punctured or unused in between 2 of the 20 MHz sub-channels). In some examples, the transmitter wireless communication device is configured to transmit a null data packet (NDP) (e.g., such as may be used in accordance with channel characterization, channel estimation, etc.).

However, note that certain standards, protocols, and/or recommended practices and associated NDP designs that are used to enable a receiver wireless communication device (e.g., wireless station (STA), etc.) to estimate the channel in order to enable transmit beamforming and downlink (DL) multiple-user multiple-input-multiple-output (MU-MIMO) do not support preamble puncturing (e.g., not using one or more of the 20 MHz sub-channels of an 80 MHz BW, a 160 MHz BW, and/or an 80+80 MHz BW, etc.). As such, the operation in accordance with a preamble puncturing mode may be limited in performance in many cases.

This disclosure presents, among other things, various new designs for a punctured NDP to be transmitted from a first wireless communication device to one or more other wireless communication devices (e.g., such as may be used in accordance with channel characterization, channel estimation, etc.).

Figure 7:
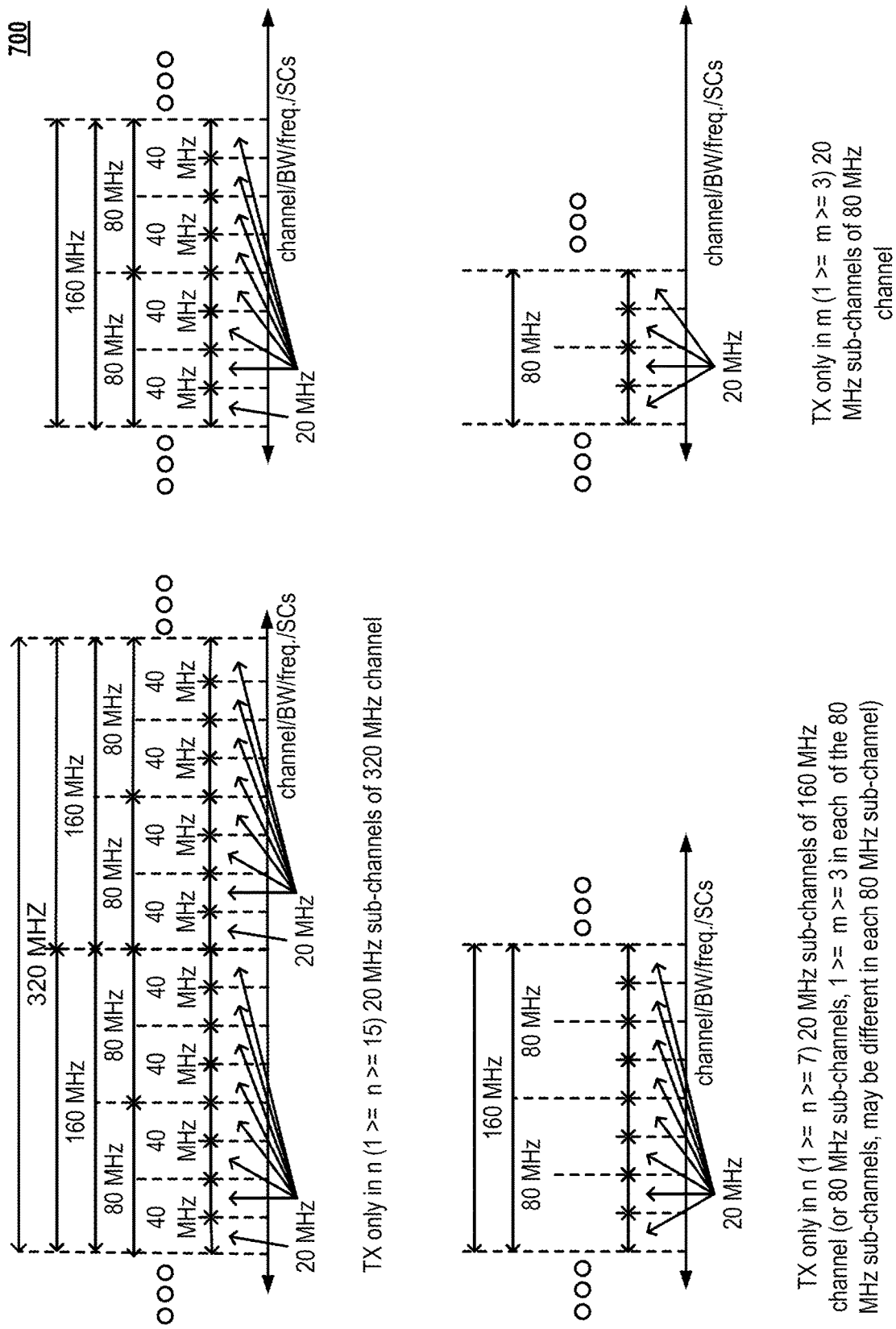

FIG. 7 is a diagram illustrating another example 700 of different channel bandwidths and relationship there between. This diagram shows a 320 MHz BW that may be viewed as being subdivided into multiple different sub-portions, sub-channels, sub-bands, etc. including 4 80 MHz BWs, 8 40 MHz BWs, 16 20 MHz BWs. Also shown, is a diagram with a 160 MHZ BW that may be viewed as being subdivided into multiple different sub-portions, sub-channels, sub-bands, etc. including 2 80 MHz BWs, 4 40 MHz BWs, 8 20 MHz BWs. In accordance with preamble puncturing, one or more of the sub-portions, sub-channels, sub-bands, etc. are not used to transmit information. For example, considering the 8 20 MHz BWs of the 160 MHz BW, one or more of those 20 MHz BWs are not used (e.g., no information is sent therein, no energy is modulated therein, etc.). In general, n (where n is greater than or equal to 1 and less than or equal to 7) of the 8 20 MHz BWs or a 160 MHz BW is not used in accordance with transmission of an NDP. Alternatively, m (where m is greater than or equal to 1 and less than or equal to 3) of the 4 20 MHz BWs or an 80 MHz BW is not used in accordance with transmission of an NDP. Similarly, other sub-portions, sub-channels, sub-bands, etc. or other sub-divided portion(s) of a communication channel bandwidth may not be used in accordance with transmission of an NDP from a transmitter wireless communication device to one or more other receiver wireless communication devices.

Various options are presented below.

Option 1:

This option uses an NDP structure (e.g., using the single user (SU) long format, such as in accordance with certain standards, protocols, and/or recommended practices (e.g., including the developing IEEE 802.11ax)) but avoids sending energy on the punctured 20 MHz sub channel(s). In this option, the receiver wireless communication device does not know that the NDP was punctured and estimates the channel across the entire BW (e.g., across an entire 80 MHz channel, an entire 160 MHz channel, an entire 80+80 MHz channel, etc.). The transmitter wireless communication device knows to ignore the values corresponding to the punctured 20 MHz sub channel(s). For example, as the receiver wireless communication device (e.g., a STA, etc.) provides feedback to the transmitter wireless communication device (e.g., an AP, an AP-operative STA, etc.), and the transmitter wireless communication device (e.g., an AP, an AP-operative STA, etc.) ignores the feedback associated with the punctured portion of the NDP transmission previously sent from the transmitter wireless communication device (e.g., an AP, an AP-operative STA, etc.) to the receiver wireless communication device (e.g., a STA, etc.).

A specific design is as follows, for each 80 MHZ:
(1) If one or more of the outer 20 MHz need to be punctured then the NDP tones (HE short training field (STF) and HE long training field (LTF)) that fall in the respective 242 RU location are punctured.
(2) If one or more of the inner 20 MHz need to be punctured then the NDP tones (HE STF and HE LTF) that fall in the respective 242 RU+center 26 RU are punctured.

Option 2:
1. Uses an unmodified Multi-user (MU) preamble format (note that this is easily differentiated from certain designs such as in accordance with certain standards, protocols, and/or recommended practices (e.g., including the developing IEEE 802.11ax))
2. The receiver does know which 20 MHz sub channels are punctured
3. Uses SIGA to signal one of the preamble puncturing options
4. Uses SIGB common field to signal center 26 RU+242 RU for those 20 MHZ sub channels that are occupied (these are the only allowed signaling combinations)
5. SIGB uses MCSO (modulation & coding set/rate (MCS) of value 0) with duration 2 symbols—user fields are minimized to padding
   a. For 80 MHz—the common field duration is 27 bits
   b. For 160/80+80—the common field duration is 43 bits Option 3:
1. Uses the MU preamble format without SIGB (receiver infers this mode by looking at the duration field in LSIG)
2. The receiver does know which 20 MHz sub channels are punctured
3. Uses SIGA to signal one of the preamble puncturing options
4. Uses the TXOP 7 bit field to signal which of the 7 non-primary 20 MHz channel are occupied (other fields could be used instead of the transmit opportunity (TXOP) field)
5. Uses other fields to signal whether center 26 RU is present or not (need one bit for 80 MHz and 2 bits for 160 MHz)

In certain of the following diagrams, the explicitly shown individual sub-carriers represent null tone/sub-carriers (e.g., those that include no data/information modulated thereon). Also, different respective RUs are shown in the various OFDMA tone/sub-carrier plans of the following diagrams such that the number shown in the diagram for a given RU (e.g., 13, 26, 52, 106, 242, 484, 994, 996, etc.) indicates the number of sub-carriers therein (e.g., an RU 13 includes 13 sub-carriers, each being one-half of a RU 26 that includes 13 sub-carriers; an RU 26 includes 26 sub-carriers; an RU 52 includes 52 sub-carriers, and so on). Note the DC denotes the center of the OFDMA sub-carriers of a given OFDMA tone/sub-carrier plan (e.g., the center frequency of a given communication channel and/or those sub-carriers substantially located near the center of the OFDMA sub-carriers, with the horizontal axis showing frequency, sub-carriers (SCs), and/or bandwidth (BW)). Also, note that each respective OFDMA tone/sub-carrier plan includes multiple sub-carrier (SC) sub-plans depicted in various levels. Generally, when descending in a given OFDMA tone/sub-carrier plan, the size of the respective RUs therein increases. Note that a given SC sub-plan may include RUs of one or two or more different sized-RUs.

Figure 8A:
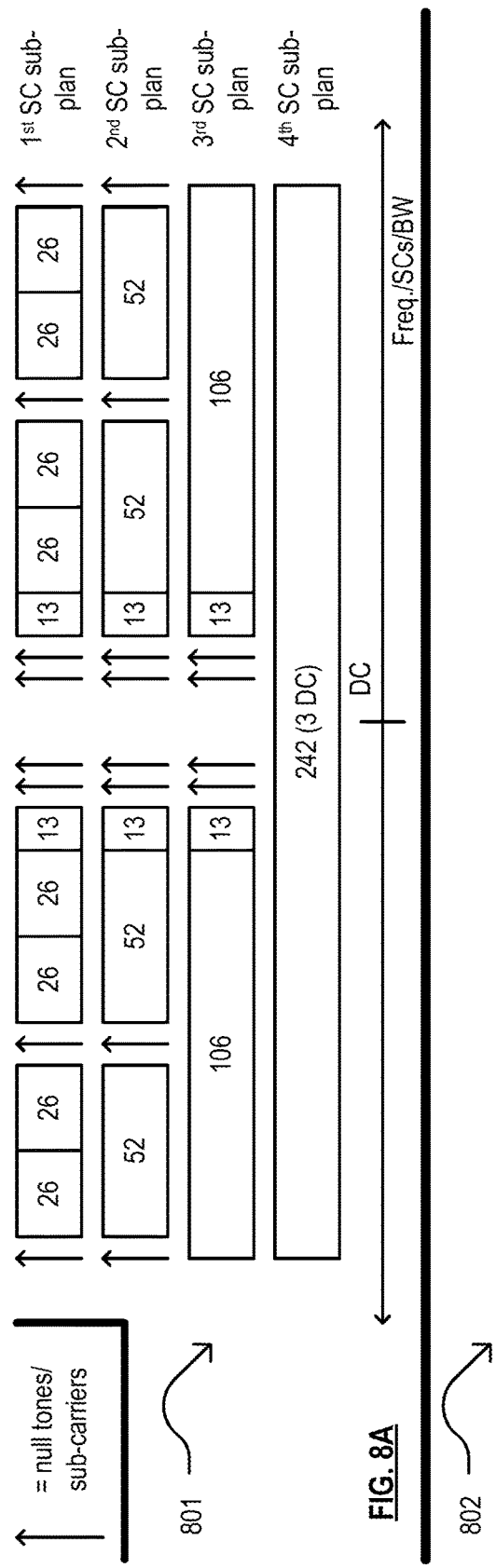
FIG. 8A is a diagram illustrating an example of an OFDMA tone/sub-carrier plan.

FIG. 8A is a diagram illustrating an example 801 of an OFDMA tone/sub-carrier plan. This diagram shows an OFDMA tone/sub-carrier plan with 4 SC sub-plans. A $1^{st}$ SC sub-plan includes multiple RUs that includes 26 sub-carriers and one sized 26 RU that is split across DC (e.g., with one respective RU that includes 13 sub-carriers on each side of DC). A $2^{nd}$ SC sub-plan includes multiple RUs that includes 52 sub-carriers and one sized 26 RU that is split across DC (e.g., with one respective RU that includes 13 sub-carriers on each side of DC); note that each RU 52 includes those sub-carriers directly included above in 2 RU 26 located directly above in the $1^{st}$ SC sub-plan. A $3^{rd}$ SC sub-plan includes multiple RUs that includes 106 sub-carriers and one sized 26 RU that is split across DC (e.g., with one respective RU that includes 13 sub-carriers on each side of DC); note that each RU 106 includes those sub-carriers directly included above in 2 RU 52 located directly as well as 2 null sub-carriers located above in the $2^{nd}$ SC sub-plan. A 4th SC sub-plan includes one RU that includes 242 sub-carriers and spans the OFDMA sub-carriers. In some examples, the OFDMA tone/sub-carrier plan of this diagram is based on a communication channel having a bandwidth of 20 MHz. In such a 20 MHz implementation, the unused sub-carrier locations for 26 tones RU (positive and negative indices) are as follows: 2, 3, 69, 122. As for construction of the OFDMA tone/sub-carrier plan in a 20 MHz implementation, RU-106 aligns with two RU-52 with one unused tone at end and one in the middle.

Note that analogous and similar principles of design are used in the following OFDMA tone/sub-carrier plans. The details are shown in the diagrams showing symmetry, construction, design, etc. of the various OFDMA tone/sub-carrier plans.

Figure 8B:
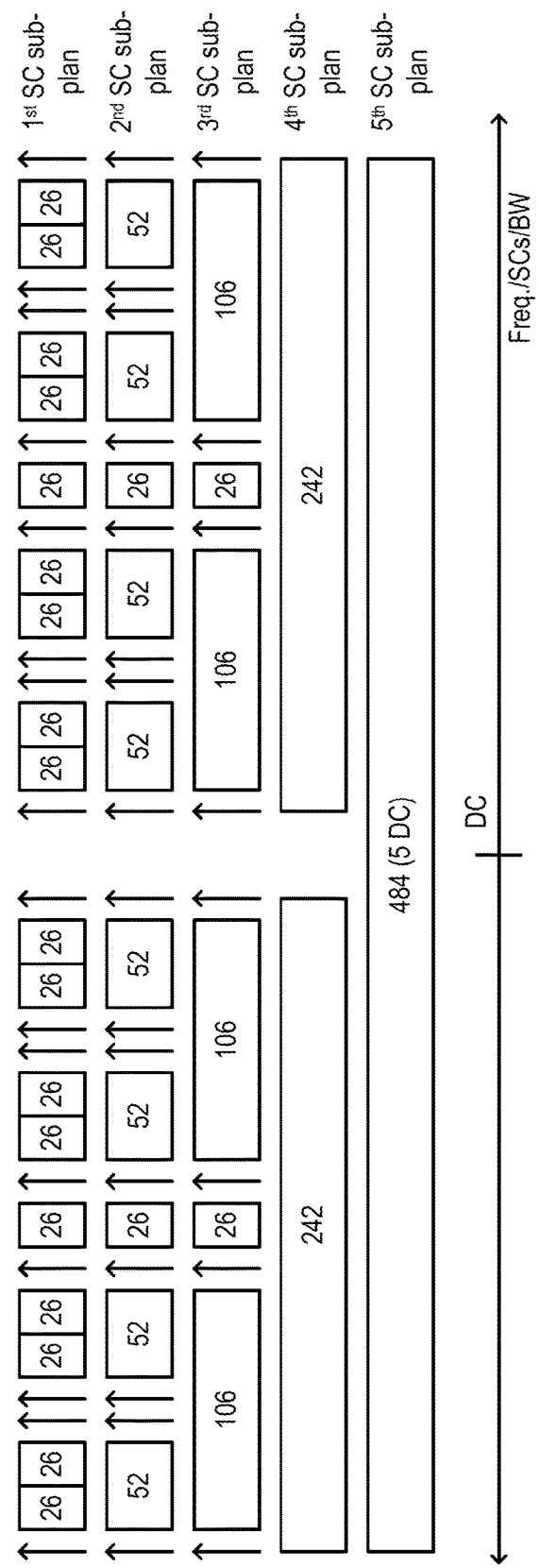
FIG. 8B is a diagram illustrating another example of an OFDMA tone/sub-carrier plan.

FIG. 8B is a diagram illustrating another example 802 of an OFDMA tone/sub-carrier plan. This diagram shows an OFDMA tone/sub-carrier plan with 5 SC sub-plans. Details are shown in the diagram. In some examples, the OFDMA tone/sub-carrier plan of this diagram is based on a communication channel having a bandwidth of 40 MHz. In such a 40 MHZ implementation, the unused sub-carrier locations for 26 tones RU (positive and negative indices) are as follows: 3, 56, 57, 110, 137, 190, 191, 244, where 56 indicates modulo 8.

FIG. 9A is a diagram illustrating another example 901 of an OFDMA tone/sub-carrier plan. This diagram shows an OFDMA tone/sub-carrier plan with 6 SC sub-plans. Details are shown in the diagram. In some examples, the OFDMA tone/sub-carrier plan of this diagram is based on a communication channel having a bandwidth of 80 MHz. In such an 80 MHZ implementation, the unused sub-carrier locations for 26 tones RU (positive and negative indices) are as follows: 17, 70, 71, 124, 151, 204, 205, 258, 259, 312, 313, 366, 393, 446, 447, 500, where 312 indicates modulo 8.

As for construction of the OFDMA tone/sub-carrier plan in a 40 MHz implementation, the design involves spreading unused tones for RU-26 and keeping alignment of two RU-26 with RU-52. As for construction of the OFDMA tone/sub-carrier plan in a 80 MHZ implementation relative to the 40 MHz implementation, the design involves no change except adding a RU-26 in center of band (e.g., split into two separate RU-13 on each side of DC).

FIG. 9B is a diagram illustrating another example 902 of an OFDMA tone/sub-carrier plan. This diagram shows an OFDMA tone/sub-carrier plan with 6 SC sub-plans. Details are shown in the diagram. In some examples, the OFDMA tone/sub-carrier plan of this diagram is based on a communication channel having a bandwidth of 160 MHZ, and this OFDMA tone/sub-carrier plan includes the OFDMA sub-carrier plan of FIG. 9A shown in the left hand side and the right hand side of DC across the communication channel having the bandwidth of 160 MHz.

Certain of the various OFDMA tone/sub-carrier plans include a first OFDMA sub-carrier sub-plan that includes first RUs of a first sub-carrier size and first null sub-carriers that are distributed across the OFDMA sub-carriers as well as a second OFDMA sub-carrier sub-plan that includes second RUs of a second sub-carrier size that are greater than the first sub-carrier size and a second null sub-carriers that are distributed across the OFDMA sub-carriers such that the second null sub-carriers are located in common locations as the first null sub-carriers within the OFDMA sub-carriers.

In some OFDMA tone/sub-carrier plan examples, within the first OFDMA sub-carrier sub-plan of the OFDMA sub-carrier plan, the first null sub-carriers of the first OFDMA sub-carrier sub-plan are interspersed among the first RUs of the first sub-carrier size. Also, a first null sub-carrier of the first null sub-carriers is located at a beginning of the OFDMA sub-carriers, and a second null sub-carrier of the first null sub-carriers is located at an end of the OFDMA sub-carriers. Also, at least one null sub-carrier of the first null sub-carriers is located between two RUs of the first RUs of the first sub-carrier size.

Also, in some OFDMA tone/sub-carrier plan examples, within the second OFDMA sub-carrier sub-plan of the OFDMA sub-carrier plan, the second null sub-carriers are interspersed among the second RUs of the second sub-carrier size that is greater than the first sub-carrier size. Also, a first null sub-carrier of the second null sub-carriers is located at the beginning of the OFDMA sub-carriers (e.g., on one edge of the OFDMA sub-carriers), and a second null sub-carrier of the second null sub-carriers is located at the end of the OFDMA sub-carriers (e.g., on another edge of the OFDMA sub-carriers). The null subcarriers are located near the DC or edge tones to provide protection from transmit center frequency leakage, receiver DC offset, and interference from neighboring RUs. The null subcarriers have zero energy. Also, at least one null sub-carrier of the second null sub-carriers is located between two RUs of the second RUs of the second sub-carrier size, and the second null sub-carriers includes a same number of null sub-carriers as the first null sub-carriers (the first and second null sub-carriers include a same number of sub-carriers and are commonly located). The null subcarriers locations for each 80 MHz frequency segment of a 160 MHz or 80+80 MHz HE PPDU (Physical layer convergence protocol Protocol Data Unit) shall follow the locations of an 80 MHz HE PPDU.

Also, in some OFDMA tone/sub-carrier plan examples, within a third OFDMA sub-carrier sub-plan of the OFDMA sub-carrier plan, third RUs of a third sub-carrier size that is greater than the second sub-carrier size and third null sub-carriers are distributed across the OFDMA sub-carriers. Also, the third null sub-carriers are interspersed among the third RUs of the third sub-carrier size that is greater than the second sub-carrier size, and the third null sub-carriers includes fewer null sub-carriers than the first null sub-carriers.

In certain specific implementations, the first RUs of the first sub-carrier size includes 26 OFDMA sub-carriers, the second RUs of the second sub-carrier size includes 52 OFDMA sub-carriers, and the third RUs of the third sub-carrier size includes 106 OFDMA sub-carriers. In addition, other RUs of different RU sizes may be included (e.g., including 242, 484, 994 and/or 996 sized RUs).

Also, in some examples, the first OFDMA sub-carrier sub-plan includes the first RUs of the first sub-carrier size, the first null sub-carriers, and at least one other RU that is one-half the first sub-carrier size that are distributed across the OFDMA sub-carriers. Also, the second OFDMA sub-carrier sub-plan includes the second RUs of the second sub-carrier size that is greater than the first sub-carrier size, the second null sub-carriers, and at least one other RU that is one-half the second sub-carrier size that are distributed across the OFDMA sub-carriers.

In some examples, certain design principles include trying to distribute the null/unused sub-carriers/tones throughout an OFDMA sub-carrier plan. For example, such a design spread the null/unused sub-carriers/tones uniformly (e.g., substantially and/or approximately) among the relatively smaller sizes RUs. Also, the design operates not to change locations (e.g., to maintain locations of null/unused sub-carriers/tones as much as possible) as the RU sizes decrease as going upwards in the OFDMA sub-carrier plans (e.g., including keeping the null/unused tones above locations identical from below).

FIG. 10A is a diagram illustrating an embodiment of a method 1001 for execution by one or more wireless communication devices. The method 1001 begins, in block 1010, by generating a null data packet (NDP). NDPs are used to enable a receiver wireless communication device (e.g., wireless station (STA), etc.) to estimate characteristics of a communications channel in order to enable transmit beamforming and downlink (DL) multiple-user multiple-input-multiple-output (MU-MIMO).

The method 1001, in block 1020, continues by transmitting at least a portion of the NDP to another wireless communication device via fewer than all of a plurality of sub-channels of a communication channel. In this case, the NDP has been punctured (fewer than all). For example, as shown in FIGS. 9A and 9B, the punctured null/unused sub-carriers/tones are distributed throughout an OFDMA sub-carrier plan.

The method 1001, in block 1030, continues by receiving feedback from the another wireless communication device that is based on the another wireless communication device (WDEV) processing at least a portion of the NDP that is received via the fewer than all of the plurality of sub-channels of the communication channel.

In one example embodiment, the feedback includes an estimate of channel characteristics estimated across the entire bandwidth, without the receiver being aware that an NDP was received punctured (with fewer than all of the plurality of sub-channels of the communication channel).

In one example embodiment, the communication channel includes a 320 MHZ communication channel and a plurality of sub-channels of the communication channel includes 16 20 MHz sub-channels (see FIG. 7, upper left) and the fewer than all of the plurality of sub-channels of the communication channel includes n of the 16 20 MHz sub-channels, wherein n is greater than or equal to 1 and less than or equal to 15.

In one example embodiment, the communication channel includes a 160 MHZ communication channel and a plurality of sub-channels of the communication channel includes 8 20 MHz sub-channels (see FIG. 7, lower left) and the fewer than all of the plurality of sub-channels of the communication channel includes n of the 8 20 MHz sub-channels, wherein n is greater than or equal to 1 and less than or equal to 7.

In another example embodiment, the communication channel includes an 80 MHZ communication channel and a plurality of sub-channels of the communication channel includes 4 20 MHz sub-channels (See FIG. 7, lower right) and the fewer than all of the plurality of sub-channels of the communication channel includes n of the 4 20 MHz sub-channels, wherein n is greater than or equal to 1 and less than or equal to 3.

In another example embodiment, generating the NDP provides at least one field therein that includes information to specify a preamble puncturing option. More specifically, the at least one field includes a signal field (SIG) that includes the information to specify the preamble puncturing option (see FIG. 5A-5E). For example, SIGA can be used to signal one puncturing options and SIGB common field used to signal center 26RU+242RU for those 20 MHz sub channels that are occupied. SIGB uses MCSO with duration 2 symbols—user fields are minimized to padding.

In another example embodiment, the wireless communication device transmits a designation of the punctured 20 MHz channels in a packet preceding the transmission of at least a portion of the NDP from the wireless communication device to the another wireless communication device. Therefore, in this embodiment the receiver does know which 20 MHz sub channels are punctured.

In another example embodiment, generating the NDP provides at least one field that includes a transmit opportunity (TXOP) field that includes the information to specify the preamble puncturing option. For example, a transmitting wireless communication device uses the MU preamble format without SIGB (receiver infers this mode by looking at a duration field in LSIG). Therefore, the receiver does know which 20 MHz sub channels are punctured. SIGA can signal one of the preamble puncturing options with the TXOP 7 bit field used to signal which of the 7 non-primary 20 MHz channel are occupied.

In another example embodiment, the communication interface (FIG. 2B) is configured to support communications within at least one of a satellite communication system, a wireless communication system, a wired communication system, a fiber-optic communication system, or a mobile communication system.

FIG. 10B is a diagram illustrating an embodiment of a method 1002 for execution by one or more wireless communication devices. The method 1002 begins, in block 1040, by receiving a null data packet (NDP). NDPs are used to enable a receiver wireless communication device (e.g., wireless station (STA), etc.) to estimate characteristics of a communications channel in order to enable transmit beamforming and downlink (DL) multiple-user multiple-input-multiple-output (MU-MIMO).

The method 1002, in block 1050, continues by the receiver of the punctured NDP estimating characteristics of the communication channel based on processing the received portion of the NDP across an entire bandwidth of the communication channel.

The method 1002, in block 1060, continues by transmitting, as feedback, the estimate of the communication channel's characteristics back to the sender (e.g., another wireless communication device).

In one example embodiment, the receiver is not aware that the received NDP was received punctured (i.e., with fewer than all of the plurality of sub-channels of the communication channel).

In one example embodiment, the communication channel includes a 320 MHZ communication channel and a plurality of sub-channels of the communication channel includes 16 20 MHz sub-channels (see FIG. 7, upper left) and the fewer than all of the plurality of sub-channels of the communication channel includes n of the 16 20 MHz sub-channels, wherein n is greater than or equal to 1 and less than or equal to 15.

In one example embodiment, the communication channel includes a 160 MHZ communication channel and a plurality of sub-channels of the communication channel includes 8 20 MHz sub-channels (see FIG. 7, lower left) and the fewer than all of the plurality of sub-channels of the communication channel includes n of the 8 20 MHz sub-channels, wherein n is greater than or equal to 1 and less than or equal to 7.

In another example embodiment, the communication channel includes an 80 MHZ communication channel and a plurality of sub-channels of the communication channel includes 4 20 MHz sub-channels (See FIG. 7, lower right) and the fewer than all of the plurality of sub-channels of the communication channel includes n of the 4 20 MHz sub-channels, wherein n is greater than or equal to 1 and less than or equal to 3.

In another example embodiment, the received NDP provides at least one field therein that includes information to specify a preamble puncturing option. More specifically, the at least one field includes a signal field (SIG) that includes the information to specify the preamble puncturing option (see FIG. 5A-5E). For example, SIGA can be used to signal one puncturing options and SIGB common field used to signal center 26RU+242RU for those 20 MHz sub channels that are occupied. SIGB uses MCSO with duration 2 symbols—user fields are minimized to padding.

In another example embodiment, the receiver (e.g., wireless communication device) receives, from another wireless communication device, a packet preceding a received NDP designating the punctured 20 MHz channels. Therefore, in this embodiment the receiver does know which 20 MHz sub channels are punctured.

In another example embodiment, the NDP provides at least one field that includes a transmit opportunity (TXOP) field that includes the information to specify the preamble puncturing option. For example, a transmitting wireless communication device uses the MU preamble format without SIGB (receiver infers this mode by looking at a duration field in LSIG). Therefore, in this embodiment the receiver does know which 20 MHz sub channels are punctured. SIGA can signal one of the preamble puncturing options with the TXOP 7 bit field used to signal which of the 7 non-primary 20 MHz channel are occupied.

It is noted that the various operations and functions described within various methods herein may be performed within a wireless communication device (e.g., such as by the processing circuitry 330, communication interface 320, and memory 340 or other configuration of circuitries such as SOC 330a and/or processing-memory circuitry 330b such as described with reference to FIG. 2B) and/or other components therein. Generally, a communication interface and processing circuitry (or alternatively processing circuitry that includes communication interface functionality, components, circuitry, etc.) in a wireless communication device can perform such operations.

Examples of some components may include one or more baseband processing modules, one or more media access control (MAC) layer components, one or more physical layer (PHY) components, and/or other components, etc. For example, such processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by processing circuitry in a first device and another processing circuitry within a second device. In other embodiments, such processing is performed wholly by processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A system, comprising a plurality of access points (APs) configured to:
generate a null data packet (NDP);
transmit at least a portion of the NDP to one or more stations (STAs) via a first subset of a plurality of sub-channels of one or more communication channels, wherein a second subset of the plurality of sub-channels is unused by the transmission;
receive a signal from at least one STA of the one of the one or more STAs that is based on the at least one STA processing the at least the portion of the NDP that is received via the first subset of the plurality of sub-channels of the one or more communication channels; and
process a portion of the signal from the at least one STA while ignoring another portion of the signal from the at least one STA that corresponds to at least one of the second subset of the plurality of sub-channels of the one or more communication channels.

2. The system of claim 1, wherein:
the one or more communication channels include a 320 MHz communication channel;
the plurality of sub-channels of the one or more communication channels include sixteen 20 MHz sub-channels; and
the first subset of the plurality of sub-channels of the one or more communication channels includes at least one and fewer than sixteen of the 20 MHz sub-channels.

3. The system of claim 1, wherein:
the one or more communication channels include a 160 MHz communication channel;
the plurality of sub-channels of the one or more communication channels include eight 20 MHz sub-channels; and
the first subset of the plurality of sub-channels of the one or more communication channels include at least one and fewer than eight of the 20 MHz sub-channels.

4. The system of claim 1, wherein:
the one or more communication channels include an 80 MHz communication channel;
the plurality of sub-channels of the one or more communication channels includes four 20 MHz sub-channels; and
the first subset of the plurality of sub-channels of the one or more communication channels includes at least one and fewer than four of the 20 MHz sub-channels.

5. The system of claim 1, further comprising:
circuitry configured to support communications within at least one of a satellite communication system, a wireless communication system, a wired communication system, a fiber-optic communication system, or a mobile communication system.

6. The system of claim 1, wherein the first subset of the plurality of sub-channels of the one or more communication channels includes one or more punctured 20 MHz channels, and wherein the plurality of APs are further configured to receive, from the at least one STA, a designation of the punctured 20 MHz channels in a packet preceding the transmission of the at least the portion of the NDP to the at least one STA.

7. A method, comprising:
communicating, by a plurality of devices with one or more other devices, a packet designating a first subset of a plurality of sub-channels of one or more communication channels comprising one or more punctured 20 MHz channels, wherein the plurality of devices comprise a plurality of access points (APs) or a plurality of stations (STAs), and wherein the one or more other devices comprise one or more APs or one or more STAs;
subsequently receiving, by the plurality of devices from the one or more other devices, a null data packet (NDP) via the first subset of the plurality of sub-channels, wherein a second subset of the plurality of sub-channels is unused;
estimating characteristics of the one or more devices across an entire bandwidth of the communication channel, by the plurality of devices, based on processing the received portion of the NDP; and
transmitting, by the plurality of devices to the one or more other devices, the estimate via the first subset of the plurality of sub-channels, receipt of the estimate causing the one or more other devices to process the estimate and ignore a signal received via the second subset of the plurality of sub-channels.

8. The method of claim 7, wherein:
the one or more communication channels include a 320 MHz communication channel;
the plurality of sub-channels of the one or more communication channels include sixteen 20 MHz sub-channels; and
the first subset of the plurality of sub-channels of the one or more communication channels includes at least one and fewer than sixteen of the 20 MHz sub-channels.

9. The method of claim 7, wherein:
the one or more communication channels includes a 160 MHz communication channel;
the plurality of sub-channels of the one or more communication channels includes eight 20 MHz sub-channels; and
the first subset of the plurality of sub-channels of the one or more communication channels includes at least one and fewer than eight of the 20 MHz sub-channels.

10. The method of claim 7, wherein:
the one or more communication channels includes an 80 MHz communication channel;
the plurality of sub-channels of the one or more communication channels includes four 20 MHz sub-channels; and
the first subset of the plurality of sub-channels of the one or more communication channels includes at least one and fewer than four of the 20 MHz sub-channels.

11. The method of claim 7, wherein communicating the packet designating the first subset further comprises transmitting, by the plurality of devices to the one or more devices, the packet.

12. The method of claim 7, wherein the signal received by the one or more devices via the second subset of the plurality of sub-channels comprises interference or a transmission of a third device using the second subset of the plurality of sub-channels.

13. The method of claim 7, wherein receipt of the estimate causes the one or more devices to ignore a portion of the estimated characteristics corresponding to at least one punctured 20 MHz channel.

14. A system, comprising one or more stations (STAs) configured to:
communicate, with one or more access points (APs), a packet designating a first subset of a plurality of sub-channels of one or more communication channels comprising one or more punctured channels;
subsequently receive, from the one or more APs, a null data packet (NDP) via the first subset of the plurality of sub-channels, wherein a second subset of the plurality of sub-channels is unused;
estimate characteristics of the one or more communication channels across a bandwidth of the one or more communication channels, based on processing the received portion of the NDP; and
transmit, to the one or more APs, the estimate via the first subset of the plurality of sub-channels, receipt of the estimate causing the one or more APs to process the estimate and ignore a signal received via the second subset of the plurality of sub-channels.

15. The system of claim 14, wherein:
the one or more communication channels includes a 320 MHz communication channel;
the plurality of sub-channels of the one or more communication channels include sixteen 20 MHz sub-channels; and
the first subset of the plurality of sub-channels of the one or more communication channels includes at least one and fewer than sixteen of the 20 MHz sub-channels.

16. The system of claim 14, wherein:
the one or more communication channels include a 160 MHz communication channel;
the plurality of sub-channels of the one or more communication channels includes eight 20 MHz sub-channels; and
the first subset of the plurality of sub-channels of the one or more communication channels includes at least one and fewer than eight of the 20 MHz sub-channels.

17. The system of claim 14, wherein:
the one or more communication channels includes an 80 MHz communication channel;
the plurality of sub-channels of the one or more communication channels includes four 20 MHz sub-channels; and
the first subset of the plurality of sub-channels of the one or more communication channels includes at least one and fewer than four of the 20 MHz sub-channels.

18. The system of claim 14, wherein the one or more STAs are configured to communicate the packet designating the first subset by transmitting the packet to the one or more devices.

19. The system of claim 14, wherein the signal received by the one or more APs via the second subset of the plurality of sub-channels comprises interference or a transmission of a second device using the second subset of the plurality of sub-channels.

20. The system of claim 14, wherein receipt of the estimate causes the one or more STAs to ignore a portion of the estimated characteristics corresponding to at least one punctured 20 MHz channel.

21. A system, comprising one or more processors configured to:
- generate a null data packet (NDP);
- transmit at least a portion of the NDP to one or more stations (STAs) via a first subset of a plurality of sub-channels of one or more communication channels, wherein a second subset of the plurality of sub-channels is unused by the transmission;
- receive a signal from at least one STA of the one of the one or more STAs that is based on the at least one STA processing the at least the portion of the NDP that is received via the first subset of the plurality of sub-channels of the one or more communication channels; and
- process a portion of the signal from the at least one STA while ignoring another portion of the signal from the at least one STA that corresponds to at least one of the second subset of the plurality of sub-channels of the one or more communication channels.

22. The system of claim 21, wherein:
- the one or more communication channels include a 320 MHz communication channel;
- the plurality of sub-channels of the one or more communication channels include sixteen 20 MHz sub-channels; and
- the first subset of the plurality of sub-channels of the one or more communication channels includes at least one and fewer than sixteen of the 20 MHz sub-channels.

* * * * *